US012417282B2

United States Patent
Volkov et al.

(10) Patent No.: US 12,417,282 B2
(45) Date of Patent: Sep. 16, 2025

(54) METHOD AND SYSTEM FOR DETECTING MALICIOUS INFRASTRUCTURE

(71) Applicant: Group IB TDS, Ltd, Moscow (RU)

(72) Inventors: Dmitry Aleksandrovich Volkov, Moscow (RU); Philipp Alekseevich Mileshin, Moscow (RU)

(73) Assignee: F.A.C.C.T. NETWORK SECURITY LLC, Moscow (RU)

( * ) Notice: Subject to any disclaimer, the term of this patent is extended or adjusted under 35 U.S.C. 154(b) by 301 days.

(21) Appl. No.: 17/528,633

(22) Filed: Nov. 17, 2021

(65) Prior Publication Data

US 2022/0075872 A1 Mar. 10, 2022

Related U.S. Application Data

(63) Continuation of application No. PCT/RU2020/000044, filed on Jan. 31, 2020.

(30) Foreign Application Priority Data

Jan. 27, 2020 (RU) .......................... RU2020103269

(51) Int. Cl.
*H04L 29/06* (2006.01)
*G06F 21/55* (2013.01)
(Continued)

(52) U.S. Cl.
CPC .......... *G06F 21/564* (2013.01); *G06F 21/552* (2013.01); *G06F 21/577* (2013.01); *H04L 63/1491* (2013.01)

(58) Field of Classification Search
CPC .... G06F 21/564; G06F 21/552; G06F 21/562; G06F 21/577; G06F 2221/034;
(Continued)

(56) References Cited

U.S. PATENT DOCUMENTS 7,225,343 B1 5/2007 Honig et al.
7,496,628 B2 2/2009 Arnold et al.
(Continued)

FOREIGN PATENT DOCUMENTS

CN 103491205 A 1/2014
CN 104504307 A 4/2015
(Continued)

OTHER PUBLICATIONS

International Search Report and Written Opinion with regard to PCT/RU2020/000044 mailed Oct. 15, 2020.
(Continued)

*Primary Examiner* — Shin-Hon (Eric) Chen
(74) *Attorney, Agent, or Firm* — BCF LLP (57) ABSTRACT

A method and a system for detecting a malicious infrastructure are provided. The method comprising: receiving a request comprising at least one infrastructure element of a given infrastructure assigned with a respective tag indicative of maliciousness of the given infrastructure; searching a database to identify therein, based at least on the respective tag, and at least one respective parameter of the at least one infrastructure element, and at least one additional infrastructure element and at least one additional respective parameter thereof; determining statistical relationships between the at least one respective parameter of at least one infrastructure element and the at least one additional respective parameter of the at least one additional infrastructure element; determining, based on the statistical relationships, rules for searching the database to identify therein new infrastructure elements; and assigning the respective tag associated with the given malicious infrastructure to the new infrastructure elements, thereby updating the database.

8 Claims, 2 Drawing Sheets

(51) Int. Cl.
*G06F 21/56* (2013.01)
*G06F 21/57* (2013.01)
*H04L 9/40* (2022.01)

(58) Field of Classification Search
CPC .............. H04L 63/1491; H04L 63/1408; H04L 63/1416; H04L 63/1433; H04L 63/145; H04L 63/1466
See application file for complete search history.

(56) References Cited

U.S. PATENT DOCUMENTS

| | | | |
|---|---|---|---|
| 7,512,980 B2 | 3/2009 | Copeland et al. | |
| 7,712,136 B2 | 5/2010 | Sprosts et al. | |
| 7,730,040 B2 | 6/2010 | Reasor et al. | |
| 7,865,953 B1 | 1/2011 | Hsieh et al. | |
| 7,926,113 B1 | 4/2011 | Gula et al. | |
| 7,930,256 B2 | 4/2011 | Gonsalves et al. | |
| 7,958,555 B1 | 6/2011 | Chen et al. | |
| 7,984,500 B1 | 7/2011 | Khanna et al. | |
| 8,132,250 B2 | 3/2012 | Judge et al. | |
| 8,151,341 B1 | 4/2012 | Gudov | |
| 8,176,178 B2 | 5/2012 | Thomas et al. | |
| 8,255,532 B2 | 8/2012 | Smith-Mickelson et al. | |
| 8,260,914 B1 | 9/2012 | Ranjan | |
| 8,285,830 B1 | 10/2012 | Stout et al. | |
| 8,402,543 B1 | 3/2013 | Ranjan et al. | |
| 8,448,245 B2 | 5/2013 | Banerjee et al. | |
| 8,532,382 B1 | 9/2013 | Ioffe | |
| 8,533,819 B2 | 9/2013 | Hoeflin et al. | |
| 8,539,582 B1 | 9/2013 | Aziz et al. | |
| 8,555,388 B1 | 10/2013 | Wang et al. | |
| 8,561,177 B1 | 10/2013 | Aziz et al. | |
| 8,578,491 B2 | 11/2013 | McNamee et al. | |
| 8,600,993 B1 | 12/2013 | Gupta et al. | |
| 8,612,463 B2 | 12/2013 | Brdiczka et al. | |
| 8,625,033 B1 | 1/2014 | Marwood et al. | |
| 8,635,696 B1 | 1/2014 | Aziz | |
| 8,635,700 B2 | 1/2014 | Richard et al. | |
| 8,650,080 B2 | 2/2014 | O'Connell et al. | |
| 8,660,296 B1 | 2/2014 | Ioffe | |
| 8,677,472 B1 * | 3/2014 | Dotan | H04L 67/131 726/12 |
| 8,776,229 B1 | 7/2014 | Aziz | |
| 8,839,441 B2 | 9/2014 | Saxena et al. | |
| 8,850,571 B2 | 9/2014 | Staniford et al. | |
| 8,856,937 B1 | 10/2014 | Wüest et al. | |
| 8,972,412 B1 | 3/2015 | Christian et al. | |
| 8,984,640 B1 | 3/2015 | Emigh et al. | |
| 9,026,840 B1 | 5/2015 | Kim | |
| 9,043,920 B2 | 5/2015 | Gula et al. | |
| 9,060,018 B1 | 6/2015 | Yu et al. | |
| 9,130,980 B2 | 9/2015 | Law et al. | |
| 9,210,111 B2 | 12/2015 | Chasin et al. | |
| 9,215,239 B1 | 12/2015 | Wang et al. | |
| 9,253,208 B1 | 2/2016 | Koshelev | |
| 9,292,691 B1 | 3/2016 | Hittel | |
| 9,330,258 B1 | 5/2016 | Satish et al. | |
| 9,338,181 B1 | 5/2016 | Burns et al. | |
| 9,357,469 B2 | 5/2016 | Smith et al. | |
| 9,456,000 B1 | 9/2016 | Spiro et al. | |
| 9,654,593 B2 | 5/2017 | Garg et al. | |
| 9,692,778 B1 * | 6/2017 | Mohanty | G06F 9/45533 |
| 9,723,344 B1 | 8/2017 | Granström et al. | |
| 9,736,178 B1 | 8/2017 | Ashley | |
| 9,838,407 B1 | 12/2017 | Oprea et al. | |
| 9,917,852 B1 | 3/2018 | Xu et al. | |
| 9,934,376 B1 | 4/2018 | Ismael | |
| 9,967,265 B1 * | 5/2018 | Peer | H04L 63/1416 |
| 10,110,601 B1 | 10/2018 | Jakobsson et al. | |
| 10,212,175 B2 | 2/2019 | Seul et al. | |
| 10,257,227 B1 * | 4/2019 | Stickle | G06F 21/577 |
| 10,284,595 B2 | 5/2019 | Reddy et al. | |
| 10,326,777 B2 | 6/2019 | Demopoulos et al. | |
| 10,440,050 B1 | 10/2019 | Neel et al. | |
| 10,462,169 B2 | 10/2019 | Joseph et al. | |
| 10,630,674 B2 | 4/2020 | Bell et al. | |
| 10,673,880 B1 * | 6/2020 | Pratt | H04L 63/1425 |
| 10,721,262 B2 | 7/2020 | Zorlular et al. | |
| 10,742,676 B2 | 8/2020 | Mahaffey et al. | |
| 10,778,701 B2 | 9/2020 | Perilli | |
| 10,848,515 B1 | 11/2020 | Pokhrel et al. | |
| 10,855,700 B1 * | 12/2020 | Jeyaraman | H04L 63/1425 |
| 10,862,907 B1 * | 12/2020 | Pon | G06F 16/955 |
| 10,873,597 B1 | 12/2020 | Mehra et al. | |
| 11,240,275 B1 * | 2/2022 | Vashisht | H04L 63/145 |
| 11,265,292 B1 | 3/2022 | Leviseur | |
| 11,425,148 B2 * | 8/2022 | Zawoad | G06N 20/20 |
| 11,500,997 B1 * | 11/2022 | Bongiorni | G05B 17/02 |
| 11,853,371 B1 * | 12/2023 | Zhou | G06N 5/025 |
| 2002/0161862 A1 | 10/2002 | Horvitz | |
| 2003/0009696 A1 | 1/2003 | Bunker et al. | |
| 2003/0028803 A1 | 2/2003 | Bunker et al. | |
| 2004/0193918 A1 | 9/2004 | Green et al. | |
| 2006/0074858 A1 | 4/2006 | Etzold et al. | |
| 2006/0107321 A1 | 5/2006 | Tzadikario | |
| 2006/0224898 A1 | 10/2006 | Ahmed | |
| 2006/0253582 A1 | 11/2006 | Dixon et al. | |
| 2007/0019543 A1 | 1/2007 | Wei et al. | |
| 2007/0239999 A1 | 10/2007 | Honig et al. | |
| 2008/0080518 A1 | 4/2008 | Hoeflin et al. | |
| 2008/0295173 A1 | 11/2008 | Tsvetanov | |
| 2009/0077383 A1 | 3/2009 | De Monseignat et al. | |
| 2009/0138342 A1 | 5/2009 | Otto et al. | |
| 2009/0281852 A1 | 11/2009 | Abhari et al. | |
| 2009/0292925 A1 | 11/2009 | Meisel | |
| 2010/0011124 A1 | 1/2010 | Wei et al. | |
| 2010/0037314 A1 | 2/2010 | Perdisci et al. | |
| 2010/0076857 A1 | 3/2010 | Deo et al. | |
| 2010/0115620 A1 | 5/2010 | Alme | |
| 2010/0115621 A1 | 5/2010 | Staniford | |
| 2010/0154059 A1 | 6/2010 | McNamee et al. | |
| 2010/0191737 A1 | 7/2010 | Friedman et al. | |
| 2010/0205665 A1 | 8/2010 | Komili et al. | |
| 2010/0228731 A1 | 9/2010 | Gollapudi | |
| 2010/0235918 A1 | 9/2010 | Mizrahi et al. | |
| 2010/0313264 A1 | 12/2010 | Xie et al. | |
| 2011/0016533 A1 | 1/2011 | Zeigler et al. | |
| 2011/0083180 A1 | 4/2011 | Mashevsky et al. | |
| 2011/0222787 A1 | 9/2011 | Thiemert et al. | |
| 2012/0011589 A1 | 1/2012 | Chen et al. | |
| 2012/0030293 A1 | 2/2012 | Bobotek | |
| 2012/0079596 A1 | 3/2012 | Thomas et al. | |
| 2012/0087583 A1 | 4/2012 | Yang et al. | |
| 2012/0158626 A1 | 6/2012 | Zhu et al. | |
| 2012/0233656 A1 | 9/2012 | Rieschick et al. | |
| 2012/0291125 A1 | 11/2012 | Maria | |
| 2013/0086677 A1 | 4/2013 | Ma et al. | |
| 2013/0103666 A1 | 4/2013 | Sandberg et al. | |
| 2013/0111591 A1 | 5/2013 | Topan et al. | |
| 2013/0117848 A1 | 5/2013 | Golshan et al. | |
| 2013/0145471 A1 | 6/2013 | Richard et al. | |
| 2013/0191364 A1 | 7/2013 | Kamel et al. | |
| 2013/0263264 A1 | 10/2013 | Klein et al. | |
| 2013/0297619 A1 | 11/2013 | Chandrasekaran et al. | |
| 2013/0312097 A1 | 11/2013 | Turnbull | |
| 2013/0340080 A1 | 12/2013 | Gostev et al. | |
| 2014/0033307 A1 | 1/2014 | Schmidtler | |
| 2014/0058854 A1 | 2/2014 | Ranganath et al. | |
| 2014/0082730 A1 | 3/2014 | Vashist et al. | |
| 2014/0173287 A1 | 6/2014 | Mizunuma | |
| 2014/0250145 A1 | 9/2014 | Jones et al. | |
| 2014/0310811 A1 | 10/2014 | Hentunen | |
| 2014/0317754 A1 | 10/2014 | Niemela et al. | |
| 2014/0380480 A1 | 12/2014 | Tang | |
| 2015/0007250 A1 | 1/2015 | Dicato, Jr. et al. | |
| 2015/0049547 A1 | 2/2015 | Kim | |
| 2015/0067839 A1 | 3/2015 | Wardman et al. | |
| 2015/0163242 A1 | 6/2015 | Laidlaw et al. | |
| 2015/0170312 A1 | 6/2015 | Mehta et al. | |
| 2015/0200962 A1 | 7/2015 | Xu et al. | |
| 2015/0200963 A1 | 7/2015 | Geng et al. | |
| 2015/0220735 A1 | 8/2015 | Paithane et al. | |
| 2015/0295945 A1 | 10/2015 | Canzanese et al. | |

(56) References Cited

U.S. PATENT DOCUMENTS

| | | |
|---|---|---|
| 2015/0363791 A1 | 12/2015 | Raz et al. |
| 2015/0381654 A1 | 12/2015 | Wang et al. |
| 2016/0036837 A1 | 2/2016 | Jain et al. |
| 2016/0036838 A1 | 2/2016 | Jain et al. |
| 2016/0044054 A1 | 2/2016 | Stiansen et al. |
| 2016/0055490 A1 | 2/2016 | Keren et al. |
| 2016/0065595 A1 | 3/2016 | Kim et al. |
| 2016/0080410 A1 | 3/2016 | Gorny et al. |
| 2016/0112445 A1 | 4/2016 | Abramowitz |
| 2016/0127907 A1 | 5/2016 | Baxley et al. |
| 2016/0142429 A1 | 5/2016 | Renteria |
| 2016/0149943 A1 | 5/2016 | Kaloroumakis et al. |
| 2016/0191243 A1 | 6/2016 | Manning |
| 2016/0205122 A1 | 7/2016 | Bassett |
| 2016/0205123 A1 | 7/2016 | Almurayh et al. |
| 2016/0226894 A1 | 8/2016 | Lee et al. |
| 2016/0253679 A1 | 9/2016 | Venkatraman et al. |
| 2016/0261608 A1* | 9/2016 | Hu .......................... H04L 63/10 |
| 2016/0261628 A1 | 9/2016 | Doron et al. |
| 2016/0267179 A1 | 9/2016 | Mei et al. |
| 2016/0285907 A1 | 9/2016 | Nguyen et al. |
| 2016/0306974 A1 | 10/2016 | Turgeman et al. |
| 2016/0308898 A1 | 10/2016 | Teeple et al. |
| 2016/0359679 A1 | 12/2016 | Parandehgheibi et al. |
| 2016/0366099 A1 | 12/2016 | Jordan |
| 2017/0034211 A1 | 2/2017 | Buergi et al. |
| 2017/0078321 A1 | 3/2017 | Maylor et al. |
| 2017/0111377 A1 | 4/2017 | Park et al. |
| 2017/0134401 A1 | 5/2017 | Medvedovsky et al. |
| 2017/0142144 A1 | 5/2017 | Weinberger et al. |
| 2017/0149813 A1 | 5/2017 | Wright et al. |
| 2017/0200457 A1 | 7/2017 | Chai et al. |
| 2017/0230401 A1 | 8/2017 | Ahmed et al. |
| 2017/0244735 A1 | 8/2017 | Visbal et al. |
| 2017/0250972 A1 | 8/2017 | Ronda et al. |
| 2017/0264627 A1 | 9/2017 | Hunt et al. |
| 2017/0272471 A1 | 9/2017 | Veeramachaneni et al. |
| 2017/0279818 A1 | 9/2017 | Milazzo et al. |
| 2017/0286544 A1 | 10/2017 | Hunt et al. |
| 2017/0289187 A1 | 10/2017 | Noel et al. |
| 2017/0295157 A1 | 10/2017 | Chavez et al. |
| 2017/0295187 A1 | 10/2017 | Havelka et al. |
| 2017/0324738 A1 | 11/2017 | Hari et al. |
| 2017/0346839 A1 | 11/2017 | Peppe et al. |
| 2017/0359368 A1* | 12/2017 | Hodgman ........... H04L 63/1441 |
| 2018/0012021 A1 | 1/2018 | Volkov |
| 2018/0012144 A1 | 1/2018 | Ding et al. |
| 2018/0034779 A1 | 2/2018 | Ahuja et al. |
| 2018/0063190 A1 | 3/2018 | Wright et al. |
| 2018/0069883 A1* | 3/2018 | Meshi ................. H04L 63/1425 |
| 2018/0096153 A1 | 4/2018 | Dewitte et al. |
| 2018/0115573 A1 | 4/2018 | Kuo et al. |
| 2018/0144138 A1 | 5/2018 | Zhang |
| 2018/0152471 A1 | 5/2018 | Jakobsson |
| 2018/0255076 A1* | 9/2018 | Paine .................. H04L 63/1416 |
| 2018/0268464 A1 | 9/2018 | Li |
| 2018/0307832 A1 | 10/2018 | Ijiro et al. |
| 2018/0309787 A1 | 10/2018 | Evron et al. |
| 2019/0089737 A1 | 3/2019 | Shayevitz et al. |
| 2019/0132344 A1* | 5/2019 | Lem ........................ G06N 20/00 |
| 2019/0132348 A1 | 5/2019 | Ng et al. |
| 2019/0207973 A1 | 7/2019 | Peng |
| 2019/0373005 A1 | 12/2019 | Bassett |
| 2020/0044911 A1* | 2/2020 | Kliger ..................... H04L 41/28 |
| 2020/0134702 A1 | 4/2020 | Li |
| 2020/0213347 A1* | 7/2020 | Kalinin ................... G06F 21/56 |
| 2021/0021644 A1 | 1/2021 | Crabtree et al. |
| 2021/0232809 A1* | 7/2021 | Shannon ................ G06N 20/00 |
| 2021/0311718 A1 | 10/2021 | Sinha et al. |
| 2022/0060507 A1 | 2/2022 | Crabtree et al. |
| 2022/0131835 A1 | 4/2022 | Fenton et al. |
| 2022/0407875 A1 | 12/2022 | Prudkovskiy et al. |

FOREIGN PATENT DOCUMENTS

| | | |
|---|---|---|
| CN | 105429955 A | 3/2016 |
| CN | 105429956 A | 3/2016 |
| CN | 105897714 A | 8/2016 |
| CN | 106131016 A | 11/2016 |
| CN | 106506435 A | 3/2017 |
| CN | 106713312 A | 5/2017 |
| CN | 107392456 A | 11/2017 |
| CN | 110138764 A | 8/2019 |
| EP | 1160646 A2 | 12/2001 |
| EP | 2410452 B1 | 1/2016 |
| EP | 3343867 A1 | 7/2018 |
| GB | 2493514 A | 2/2013 |
| KR | 10-2007-0049514 A | 5/2007 |
| KR | 10-1514984 B1 | 4/2015 |
| RU | 2382400 C2 | 2/2010 |
| RU | 107616 U1 | 8/2011 |
| RU | 2446459 C1 | 3/2012 |
| RU | 129279 U1 | 6/2013 |
| RU | 2487406 C1 | 7/2013 |
| RU | 2488880 C1 | 7/2013 |
| RU | 2495486 C1 | 10/2013 |
| RU | 2522019 C1 | 7/2014 |
| RU | 2523114 C2 | 7/2014 |
| RU | 2530210 C2 | 10/2014 |
| RU | 2536664 C2 | 12/2014 |
| RU | 2538292 C1 | 1/2015 |
| RU | 2543564 C1 | 3/2015 |
| RU | 2566329 C2 | 10/2015 |
| RU | 2571594 C2 | 12/2015 |
| RU | 2589310 C2 | 7/2016 |
| RU | 164629 U1 | 9/2016 |
| RU | 2601147 C2 | 10/2016 |
| RU | 2607231 C2 | 1/2017 |
| RU | 2610586 C2 | 2/2017 |
| RU | 2613535 C1 | 3/2017 |
| RU | 2622870 C2 | 6/2017 |
| RU | 2625050 C1 | 7/2017 |
| RU | 2628192 C2 | 8/2017 |
| RU | 2634209 C1 | 10/2017 |
| RU | 2636702 C1 | 11/2017 |
| RU | 2670906 C9 | 12/2018 |
| RU | 2681699 C1 | 3/2019 |
| RU | 2697926 C1 | 8/2019 |
| RU | 2697935 C2 | 8/2019 |
| RU | 2722693 C1 | 6/2020 |
| RU | 2738335 C1 | 12/2020 |
| WO | 0245380 A2 | 6/2002 |
| WO | 2009/026564 A1 | 2/2009 |
| WO | 2011/045424 A1 | 4/2011 |
| WO | 2012/015171 A2 | 2/2012 |
| WO | 2019/010182 A1 | 1/2019 |
| WO | 2019004503 A1 | 1/2019 |
| WO | 2019/153384 A1 | 8/2019 |

OTHER PUBLICATIONS

Search Report with regard to the counterpart RU Patent Application No. 2020103269 mailed Mar. 24, 2020.
Notice of Allowance with regard to the counterpart U.S. Appl. No. 16/270,341 mailed Mar. 25, 2021.
Notice of Allowance with regard to the counterpart U.S. Appl. No. 16/239,605 mailed Jan. 25, 2021.
Office Action with regard to the counterpart U.S. Appl. No. 16/270,341 mailed Dec. 4, 2020.
Search Report with regard to the counterpart RU Patent Application No. 2019142440 completed Oct. 26, 2020.
Search Report with regard to the counterpart NL Patent Application No. 2030861 completed Dec. 16, 2022.
Search Report with regard to the counterpart RU Patent Application No. 2021115690 completed May 19, 2022.
English Abstract of RU107616 retrieved on Espacenet on Jul. 3, 2017.
European Search Report with regard to EP17180099 completed on Nov. 28, 2017.

(56) References Cited

OTHER PUBLICATIONS

European Search Report with regard to EP17191900 completed on Jan. 11, 2018.
Yoshioka et al., "Sandbox Analysis with Controlled Internet Connection for Observing Temporal Changes of Malware Behavior", https://www.researchgate.net/publication/254198606, 15 pages.
Yoshioka et al., "Multi-Pass Malware Sandbox Analysis with Controlled Internet Connection", IEICE Transactions on Fundamentals of Electronics, Communications and Computer Sciences, Engineering Sciences Society, Tokyo, 2010, vol. E93A, No. 1, pp. 210-218.
Wikipedia, "Blockchain", https://en.wikipedia.org/wiki/Blockchain, pdf document, 18 pages.
Search Report with regard to the counterpart RU Patent Application No. 2018101764 completed Jun. 29, 2018.
Search Report with regard to the counterpart RU Patent Application No. 2018101761 completed Jun. 20, 2018.
International Search Report with regard to the counterpart Patent Application No. PCT/RU2016/000526 mailed Jun. 1, 2017.
European Search Report with regard to the counterpart EP Patent Application No. EP17210904 completed May 16, 2018.
Search Report with regard to the counterpart RU Patent Application No. 2018101759 completed Sep. 7, 2018.
English Abstract of RU129279 retrieved on Espacenet on Sep. 11, 2017.
English Abstract of RU164629 retrieved on Espacenet on Sep. 11, 2017.
English Abstract of RU2538292 retrieved on Espacenet on Sep. 11, 2017.
Prakash et al., "PhishNet: Predictive Blacklisting to Detect Phishing Attacks", INFOCOM, 2010 Proceedings IEEE, USA, 2010, ISBN: 978-1-4244-5836-3, doc. 22 pages.
Search Report with regard to the counterpart Patent Application No. RU2018105377 completed Oct. 15, 2018.
Search Report with regard to the counterpart RU Patent Application No. 2018101763 completed Jan. 11, 2019.
Search Report with regard to the counterpart RU Patent Application No. 2016137336 completed Jun. 6, 2017.
English Abstract of RU2522019 retrieved on Espacenet on Jan. 25, 2019.
Search Report with regard to the counterpart RU Patent Application No. 2017140501 completed Jul. 11, 2018.
Notice of Allowance with regard to the counterpart U.S. Appl. No. 17/019,730 mailed Apr. 29, 2022.
Search Report with regard to the counterpart RU Patent Application No. 2021116850 completed Feb. 17, 2022.
English Translation of CN106713312, © Questel—FAMPAT, Jul. 17, 2019.
English Translation of CN105897714, © Questel—FAMPAT, Jul. 17, 2019.
English Translation of CN106506435, © Questel—FAMPAT, Jul. 26, 2019.
English Translation of CN107392456, © Questel—FAMPAT, Jul. 29, 2019.
English Translation of CN103491205, © Questel—FAMPAT, Jul. 29, 2019.
English Translation of CN106131016, © Questel—FAMPAT, Jul. 17, 2019.
Invitation to Respond to Written Opinion with regard to the counterpart SG Patent Application No. 10201900339Q.
Invitation to Respond to Written Opinion with regard to the counterpart SG Patent Application No. 10201901079U.
Invitation to Respond to Written Opinion with regard to the counterpart SG Patent Application No. 10201900335P.
Search Report with regard to the counterpart RU Patent Application No. 2018144708 completed Aug. 16, 2019.
Search Report with regard to the counterpart RU Patent Application No. 2018147431 completed Aug. 15, 2019.
English Translation of KR10-2007-0049514 (Description, Claims) retrieved on Espacenet on Oct. 15, 2019.
English Abstract of KR10-1514984 retrieved on Espacenet on Oct. 15, 2019.
Office Action with regard to the counterpart U.S. Appl. No. 16/261,854 mailed Oct. 21, 2019.
Notice of Allowance with regard to the counterpart U.S. Appl. No. 15/707,641 mailed Oct. 30, 2019.
Whyte, "DNS-based Detection of Scanning Worms in an Enterprise Network", Aug. 2004, NOSS, pp. 1-17 (Year: 2005)—in the Notice of Allowance with regard to the counterpart U.S. Appl. No. 15/707,641.
Office Action with regard to the counterpart U.S. Appl. No. 15/858,013 mailed Nov. 22, 2019.
Search Report with regard to the counterpart SG Patent Application No. 10201900062S mailed Dec. 5, 2019.
Search Report with regard to the counterpart SG Patent Application No. 10201900060Y mailed Dec. 5, 2019.
English Abstract for CN105429956 retrieved on Espacenet on Jan. 7, 2020.
English Abstract for CN104504307 retrieved on Espacenet on Jan. 7, 2020.
Office Action received with regard to the counterpart U.S. Appl. No. 15/858,032 mailed Apr. 6, 2020.
Office Action with regard to the counterpart U.S. Appl. No. 16/270,341 mailed May 27, 2020.
Notice of Allowance with regard to the counterpart U.S. Appl. No. 15/858,013 mailed May 8, 2020.
English Abstract for CN105429955 retrieved on Espacenet on Jul. 13, 2020.
European Search Report with regard to the counterpart EP Patent Application No. EP17211131 completed Apr. 12, 2018.
Search Report with regard to the counterpart RU Patent Application No. 2018101760 completed Jun. 22, 2018.
Office Action with regard to the counterpart U.S. Appl. No. 15/707,641 mailed Apr. 25, 2019.
Notice of Allowance with regard to the counterpart U.S. Appl. No. 15/858,013 mailed Jun. 10, 2020.
Notice of Allowance with regard to U.S. Appl. No. 17/712,243 mailed Mar. 20, 2024.
Notice of Allowance with regard to U.S. Appl. No. 17/828,396 mailed Apr. 5, 2024.

\* cited by examiner

METHOD AND SYSTEM FOR DETECTING MALICIOUS INFRASTRUCTURE

CROSS-REFERENCE

The present application is a continuation of International Patent Application No. PCT/RU2020/000044, entitled "METHOD AND SYSTEM FOR MALWARE OR CYBER-CRIMINAL INFRASTRUCTURE DETECTION," filed on Jan. 31, 2020, the entirety of which is incorporated herein by reference.

FIELD

This technical solution generally relates to the field of cybersecurity; and, in particular, to methods and systems for detecting malicious infrastructure.

BACKGROUND

Certain prior art approaches for detecting malicious infrastructures have been proposed.

Russian Patent No.: 2,523,114-C2 issued on Jul. 20, 2014 assigned to "Kaspersky Laboratory", ZAO, and entitled "METHOD OF ANALYSING MALICIOUS ACTIVITY ON INTERNET, DETECTING MALICIOUS NETWORK NODES AND NEIGHBOURING INTERMEDIATE NODES" discloses a method of detecting intermediate nodes in a computer network through which malware is distributed, wherein the intermediate nodes are connected to the Internet, to which malicious nodes are also connected. The present method employs a system of computer tools, services for detecting a traffic route in a network, a WHOIS service for accessing login information about an owner of a domain or IP address, followed by constructing flow chart of distribution of malware from a malicious site over data link channels, evaluating the usage rate of the link channel for distributing malware, detecting and blocking an intermediate node used illegally; the method further allows the unblocking of the intermediate node if the intensity of distribution of malware considerably drops over time or ceases to pose a threat to the site which directly contained the malware.

U.S. Pat. No. 8,176,178-B2 issued on May 8, 2012, assigned to ThreatMetrix Pty Ltd, and entitled "METHOD FOR TRACKING MACHINES ON A NETWORK USING MULTIVARIABLE FINGERPRINTING OF PASSIVELY AVAILABLE INFORMATION" discloses a method for tracking machines on a network of computers. The method includes determining one or more assertions to be monitored by a first web site which is coupled to a network of computers. The method monitors traffic flowing to the web site through the network of computers and identifies the one or more assertions from the traffic coupled to the network of computers to determine a malicious host coupled to the network of computers. The method includes associating a first IP address and first hardware finger print to the assertions of the malicious host and storing information associated with the malicious host in one or more memories of a database. The method also includes identifying an unknown host from a second web site, determining a second IP address and second hardware finger print with the unknown host, and determining if the unknown host is the malicious host.

Russian Patent No.: 2,634,209-C1 issued on Oct. 24, 2017, assigned to Group IB TDS, and entitled "SYSTEM AND METHOD OF AUTOGENERATION OF DECISION RULES FOR INTRUSION DETECTION SYSTEMS WITH FEEDBACK" discloses method includes the following steps: receiving at least one event from the event database generated by data received from at least one sensor; analyzing at least one received event for the class of interaction with the malware control centres; extracting from at least one of the above-mentioned events of the class of interaction with the malware control centres at least one feature used to form the decision rules; form decision rules using at least one of the above-mentioned extracted feature; storing the formed decision rules and providing an opportunity to receive an update of the decision rules for at least one sensor; sensors cyclically check the availability of updates in the central node and, if updates are available, receive them for use, and if updates are received, a trigger is activated in the sensors that restarts the decision rules.

SUMMARY

It is an object of the present technology to ameliorate at least some of the inconveniencies of the prior art.

Unlike the prior art, the present methods and systems allow identifying malicious infrastructures, such as those associated with a given piece of malware or with a cyber-criminal, by determining certain rules, without analyzing traffic routes and the traffic itself. Each new rule enables to detect a respective malicious infrastructure. This includes, inter alia, identifying a currently operating malicious infrastructure, or the one which had worked a year ago and then was permanently deactivated, or even those malicious infrastructures which do not exist yet and are only being developed by a criminal-because he/she would disclose their preferences while developing a given future malicious infrastructure, which can further be identified by the rules disclosed herein.

More specifically, in accordance with one broad aspect of the present technology, there is provided a computer-implementable method for detecting malicious infrastructure. The method is executable by a processor communicatively coupled to an infrastructure element database. The method comprises: receiving, by the processor, a request comprising at least one infrastructure element of a given malicious infrastructure, the at least one infrastructure element being assigned with a respective tag indicative of maliciousness of the given malicious infrastructure; searching, by the processor, the infrastructure element database to identify therein, based at least on the respective tag associated with the at least one infrastructure element, at least one respective parameter thereof and at least one additional infrastructure element and at least one additional respective parameter thereof, the at least additional infrastructure element being assigned with the respective tag; analyzing, by the processor, (i) the at least one infrastructure element and the at least one respective parameter thereof, and (ii) the at least one additional infrastructure element and the at least one additional respective parameter thereof to determine statistical relationships between the at least one respective parameter of at least one infrastructure element and the at least one additional respective parameter of the at least one additional infrastructure element; determining, by the processor, based on the statistical relationships, rules for identifying, in the infrastructure element database, new infrastructure elements; retrieving, by the processors, using the rules, from the infrastructure element database, the new infrastructure elements; and assigning, by the processor, the respective tag associated with the given malicious infrastructure to the new infrastructure elements, thereby updating the infrastructure element database for further use in determining new infrastructure elements of the given malicious infrastructure.

In some implementations of the method, the at least one infrastructure element of the given malicious infrastructure comprises at least one of:
- an IP address;
- a domain name;
- an SSL certificate;
- a server;
- a web service;
- an e-mail address; and
- a telephone number.

In some implementations of the method, the infrastructure element database is continuously updated using data obtained by scanning the Internet.

In some implementations of the method, the scanning the Internet is performed by at least one vulnerability scanner.

In some implementations of the method, the respective tag is one of a conventional name and a common name of at least one of a piece malware and a cybercriminal associated with the given malicious infrastructure.

In some implementations of the method, the request comprising the at least one infrastructure element is received from at least one of:
- a sandbox;
- a malware detonation platform;
- a vulnerability scanner;
- a honeypot;
- an intrusion detection system; and
- a system of emergency response to cyber security incidents.

In some implementations of the method, the statistical relationships are determined using a trained machine learning algorithm.

In some implementations of the method, the statistical relationships between the at least one respective parameter and at least one additional respective parameter represent a combination thereof by at least one logic operation, and wherein each of the at least one infrastructure element and the at least one additional infrastructure elements respectively associated therewith are different infrastructure elements.

In some implementations of the method, the rules are stored and updated.

In accordance with another broad aspect of the present technology, there is provided a system for malware or cybercriminal infrastructure detection. The system comprises: a processor communicatively coupled to an infrastructure element database and a non-transitory computer-readable memory storing instructions. The processor, upon executing the instructions, is configured to: receive a request comprising at least one infrastructure element of a given malicious infrastructure, the at least one infrastructure element being assigned with a respective tag indicative of maliciousness of the given malicious infrastructure; search the infrastructure element database to identify therein, based at least on the respective tag associated with the at least one infrastructure element, at least one respective parameter thereof and at least one additional infrastructure element and at least one additional respective parameter thereof, the at least additional infrastructure element being assigned with the respective tag; analyze (i) the at least one infrastructure element and the at least one respective parameter thereof, and (ii) the at least one additional infrastructure element and the at least one additional respective parameter thereof to determine statistical relationships between the at least one respective parameter of at least one infrastructure element and the at least one additional respective parameter of the at least one additional infrastructure element; determine, based on the statistical relationships, rules for identifying, in the infrastructure element database, new infrastructure elements; retrieve, using the rules, from the infrastructure element database, the new infrastructure elements; and assign the respective tag associated with the given malicious infrastructure to the new infrastructure elements, thereby updating the infrastructure element database for further use in determining new infrastructure elements of the given malicious infrastructure. In the context of the present specification, the following terms should be interpreted as follows.

Malicious infrastructure denotes a computer system running a piece of malware and/used by a cybercriminal for conducting malicious activity, and characterized, for example, without limitation, by at least some of: IP addresses, domain names, SSL certificates, servers (specially configured software) and web services, e-mail addresses, telephone numbers.

Infrastructure element parameters denote parameters attributable to each infrastructure element of a given type. For example, the parameters characterizing such infrastructure element as web service may include a port number of a port where this web service is launched, date and time of its launch, and also date and time of its stop.

Some parameters are specific to a particular type of infrastructure elements, for example, name of registrar company is specific to a parameter of "domain name" type. Other infrastructure elements could be more complex, that is, can be characterized by multiple parameters. For example, such specific parameter of IP address element as hosting provider is additionally characterized by geographic location, set of web services and servers available to hosting provider clients, range of IP addresses belonging to this hosting provider, etc.

Statistical relationship between parameters of two and more infrastructure elements denotes at least one of an arithmetical, logical or other correspondence enabling to detect, for example, in a database, one more other infrastructure elements of a similar type, whose respective same-name parameters are linked to the parameters of the known infrastructure elements by the same relationship.

For example, there are known IP addresses 11.22.33.44 and 55.66.77.88 issued by hosting provider Provider, LLC on the same day, 11.11.2011, to the client with contact address client@mail.com and contact phone+1 (099) 100-100-10. Statistical relationship between these two IP addresses and the third IP address 99.00.22.11, issued on some other day, for example, 12.12.2012, is that they are issued by the same hosting provider Provider, LLC to the client with the same contact address client@mail.com but with the other contact phone+1 (059) 200-200-20.

Rule for searching for new infrastructure elements denotes a decision rule able to retrieve, in a database of a known structure, occurrences which satisfy the specified conditions, for example, all IP addresses issued by the specified hosting provider on a same day. The rule could be implemented as a script, regular expression, determined using a trained machine-learned algorithm, such as classifier, etc.

Further, in the context of the present specification, unless expressly provided otherwise, a computer system may refer, but is not limited, to an "electronic device", an "operation system", a "system", a "computer-based system", a "controller unit", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

BRIEF DESCRIPTION OF THE DRAWINGS

Non-limiting embodiments of the present technology are described herein with reference to the accompanying drawings; these drawings are only presented to explain the essence of the technology and are not intended to limit the scope thereof in any way, where.

DETAILED DESCRIPTION

The following detailed description is provided to enable anyone skilled in the art to implement and use the non-limiting embodiments of the present technology. Specific details are provided merely for descriptive purposes and to give insights into the present technology, and in no way as a limitation. However, it would be apparent to a person skilled in the art that some of these specific details may not be necessary to implement certain non-limiting embodiments of the present technology. The descriptions of specific implementations are only provided as representative examples. Various modifications of these embodiments may become apparent to the person skilled in the art; the general principles defined in this document may be applied to other non-limiting embodiments and implementations without departing from the scope of the present technology.

Certain non-limiting embodiments of the present technology are directed to methods and systems for detecting malicious infrastructures.

Method

Figure 1:
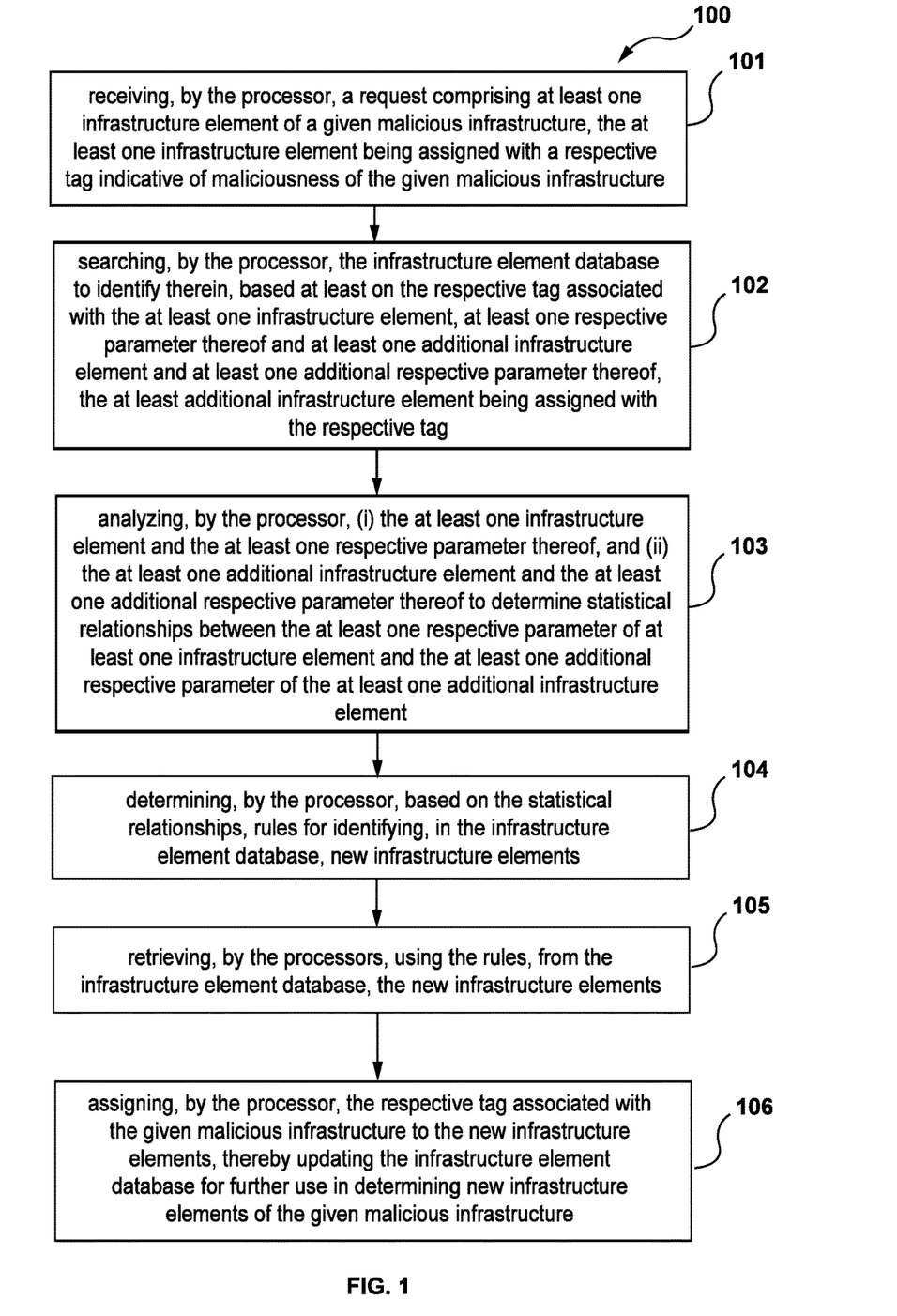
FIG. 1 depicts a flowchart diagram of a method for detecting a malicious infrastructure, in accordance with certain non-limiting embodiments of the present technology.

With reference to FIG. 1, there is depicted a flowchart diagram of a method (100) of detecting a malicious infrastructure, in accordance with certain non-limiting embodiments of the present technology. The method 100 can be implemented by a processor 201 of a computer system 200 described hereinbelow with reference to FIG. 2.

Step 101: Receiving, by the Processor, a Request Comprising at Least One Infrastructure Element of a Given Malicious Infrastructure, the at Least One Infrastructure Element being Assigned with a Respective Tag Indicative of Maliciousness of the Given Malicious Infrastructure At step (101), according to certain non-limiting embodiments of the present technology, the processor 201 can be configured to receive a request comprising at least one infrastructure element of a given malicious infrastructure, and a respective tag of this element belonging to a malware or cybercriminal, that is, indicative of maliciousness of the given malicious infrastructure.

In some non-limiting embodiments of the present technology, infrastructure elements can comprise, for example, but without limitation, an IP address, a domain name, an SSL certificate, a server, a web service, an e-mail address, a telephone number. Conventional or common name of a malware or cybercriminal, for example, Zeus malware, could be used as the respective tag of a given infrastructure element belonging to a malware or cybercriminal.

In some non-limiting embodiments of the present technology, the processor 201 can be configured to receive the request comprising the at least one infrastructure element from one of the following incoming request sources including, but not limited to, a sandbox (dedicated environment for program safe running) or a malware detonation platform, a vulnerability scanner, various honeypots (resource attracting the cybercriminal), an intrusion detection system, a system of emergency response to cyber security incidents.

It is the vulnerability scanner that is used to take footprints from the services deployed at remote server ports. The vulnerability scanner as such could be implemented by any common method.

All the listed programs and systems could be either inside one intranet with a system implementing the method, or at remote servers with Internet communication therebetween.

The incoming request sources could also include systems of emergency response to cyber security incidents, CERT (Computer Emergency Response Team), automatically informing about a malicious activity in the monitored networks, remote computers, which owners send data on detection of malwares in their computers to the specified e-mail address, mobile phones, which owners send SMS or MMS containing data on malware running to the specified number.

Further, in some non-limiting embodiments of the present technology, the incoming request sources could also include a system operator receiving the corresponding information by phone or e-mail.

Further, the processor 201 can be configured to extract, from the request, information about the at least one infrastructure element, and also information about this element belonging to the given malicious infrastructure, that is, about the respective tag.

For example, the sandbox has sent a request containing information that Zeus malware sends data from the infected computer to the server with the domain bad-domain.com, wherein this domain's current IP address is 11.22.33.44. The processor 201 can thus extract this IP address tagged with a respective Zeus tag.

The method 100 thus advances to step 102.

Step 102: Searching, by the Processor, the Infrastructure Element Database to Identify Therein, Based at Least on the Respective Tag Associated with the at Least One Infrastructure Element, at Least One Respective Parameter Thereof and at Least One Additional Infrastructure Element and at Least One Additional Respective Parameter Thereof, the at Least Additional Infrastructure Element being Assigned with the Respective Tag;

Further, at step (102), according to certain non-limiting embodiments of the present technology, the processor 21 can be configured to extract, from a database, at least one respective parameter of the so obtained at least one infrastructure element, at least one additional infrastructure element of the given malicious infrastructure, and at least one additional respective parameter of the at least one additional infrastructure element. In some non-limiting embodiments of the present technology, the database may include data on infrastructure elements obtained from the Internet, such as by crawling, as an example.

The processor 201 can be configured to search the database for all records comprising the at least one infrastructure element and also the respective tag associated therewith.

Needless to mention that the database itself and the search in it could be implemented by any known method, for example, by that described in a Russian Patent No.: 2,681,699-C1 issued on Mar. 12, 2019, assigned to Trust LLC, and entitled "METHOD AND SERVER FOR SEARCHING RELATED NETWORK RESOURCES", content of which is incorporated herein by reference in its entirety. Similarly to the method described in this patent, the database information could be structured as a table illustrating relationship between at least the following parameters so that at least one of the following parameters corresponds to each infrastructure element, for example, domain name: tag, IP address, SSL key, SSH footprint, list of running services, history of running services, history of domain names, history of IP addresses, history of DNS servers, history of domain name or IP address owners.

The parameters could also include DNS resource records which are records on compliance of name and service information in the domain name system.

It should be noted that the data on the infrastructure elements could be stored in one or several databases or tables. In general, search is carried out by traditional methods: one or multiple request to these bases/tables and search for intersections of results.

For example, as a result of a search for domain name bad-domain.com nothing was found in the database, during search for IP address 11.22.33.44 nothing was found in the database. However, by searching for the respective Zeus tag, the processor 201 can be configured to identify the IP address 55.66.77.88 also Zeus-tagged before.

Thus, in accordance with certain non-limiting embodiments of the present technology, the processor 201 can be configured to retrieve the at least one additional infrastructure element and the at least one additional respective parameter associated therewith from the database for further analysis.

In the above example, for IP address 55.66.77.88 found in the database there will be extracted, for example: domain name another-bad-domain.net, name of this IP address owner—Provider, LLC, name of this domain name registrar-Registrar, LLC, date of issue of this IP address-11.11.2011, date of registration of this domain name-22.12.2011, e-mail of the client to whom this IP address was issued-client@mail.com and client's contact phone number: +1 (099) 100-100-10.

If some infrastructure elements are not found in the database at the second step, in some non-limiting embodiments of the present technology, the processor 201 can be configured to search online sources available for further retrieval therefrom of the parameters associated with such infrastructure elements. It could be done using, for example, a Whois online service or any known program fit for purpose, for example, an nslookup program.

In this case, the processor 201 can be configured, for example, to automatically send the corresponding search request to the Whois online service and extract the required data from Whois online service response or from a web page with the search request results. The latter could be done by making use of, for example, the processor 201 executing a special parser and analyzing, for example, the text of Whois online service response or html code of the specified web page.

In the given example for IP address 11.22.33.44 and domain name bad-domain.com, the processor 2021 can be configured to retrieve the following data: a name of this IP address owner-Provider, LLC, a name of this domain name registrar-AnotherRegistrar, LLC, a date of issue of this IP address-11.11.2011, a date of registration of this domain name-23.12.2011, an e-mail of the client to whom this IP address was issued-anotherclient@mail.com and a client's contact phone number: +1 (099) 300-300-30.

Further, the processor 201 can be configured to store these parameters in the database together with the reference to the relationship between the said parameters, IP address 11.22.33.44, the domain name bad-domain.com, the respective Zeus tag, and also a date of retrieval of the specified infrastructure elements and a source from which they have been retrieved (in this case-identifier of the sandbox where Zeus malware activity was detected in the example in question).

The method 100 hence proceeds to step (103).

Step 103: Analyzing, by the Processor, (I) the at Least One Infrastructure Element and the at Least One Respective Parameter Thereof, and (II) the at Least One Additional Infrastructure Element and the at Least One Additional Respective Parameter Thereof to Determine Statistical Relationships Between the at Least One Respective Parameter of at Least One Infrastructure Element and the at Least One Additional Respective Parameter of the at Least One Additional Infrastructure Element At step (103), the processor 201 can be configured to analyze (i) the at least one infrastructure element and at least one respective parameter thereof, and (ii) the at least one additional infrastructure element and the at least one additional respective parameter thereof.

Following the above example, the processor 201 can be configured to analyze the following infrastructure elements and their parameters: the domain names bad-domain.com and another-bad-domain.net, IP addresses 11.22.33.44 and 55.66.77.88, the names of this IP address owners (they are the same in our example), the names of this domain name registrars-Registrar, LLC and AnotherRegistrar, LLC, dates of issue of each IP address (they are the same in our example), the dates of registration of each domain name, 22.12.2011 and 23.12.2011, the client's e-mail addresses, the contact phone numbers; and the respective Zeus tag.

Further, according to certain non-limiting embodiments of the present technology, the processor 201 can be configured to determine, based on the conducted analysis, statistical relationships between the at least one respective parameter of the at least one infrastructure element and the at least one additional respective parameter of the at least one additional infrastructure element.

More specifically, the processor 201 can be configured to build the statistical relationships including arithmetical, logical, or other correspondence enabling to detect in the database, based on known relations between parameters of one-type infrastructure elements, at least one more new one-type infrastructure elements, which same-name parameters are linked to the parameters of the known elements with the same relation.

For example, the processor 201 can be configured to determine that:
  the obtained IP addresses belong to one and the same owner, Provider, LLC,
  both IP addresses have been issued on the same day, 11.11.2011,
  client's e-mail addresses, although belong to different accounts, client@mail.com and anotherclient@mail.com, are registered at one and the same mail server mail.com.

Correspondingly, the processor 201 can be configured to save the so determined statistical relationship in the following simple logical expression:

IPADDRESS_OWNER="Provider,LLC"_⊆_IPAD-
  DRESS_ISSUE_DATE="11.11.2
  011"_Λ_CLIENT_EMAIL="*@mail.com",
where Λ-conjunction operator, logical AND, *-so called wildcard character, which means that any number of any consecutive characters without spaces could be in its place.

Hereinafter, statistical relationship features mean those infrastructure elements of parameters or infrastructure elements, a combination of which enables to build the detected statistical relationship. In the above example, this is the name of the IP addresses owner (provider), the IP address issue date and part of the client's e-mail address.

It should be noted that the above examples is provided solely for clarity of explanation of the non-limiting embodiments of the present technology, and in more complex examples the processor 201 can be configured to receive for analysis a list of several hundreds of IP addresses registered at different times at different providers and not related to repeated or similar domain names, and also a list of running services interrelated with each of these IP addresses, and a list of running services history. When such data are analyzed by the processor 201, more complex statistical relationship could be determined. For example, the processor 201 can be configured to determine that at each of these IP addresses Apache HTTP server was started at least once, which run for 48 hours and was stopped, and immediately after it stops the e-mail server CommuniGate Pro version 5.1 was started at the same IP address with XIMSS API interface support.

Detection of statistical relationships described above could be performed by specifically trained machine learning algorithms.

The method 100 thus proceeds to step (104).
Step 104: Determining, by the Processor, Based on the Statistical Relationships, Rules for Identifying, in the Infrastructure Element Database, New Infrastructure Elements At step (105), according to certain non-limiting embodiments of the present technology, the processor 201 can be configured to generate, based on the detected statistical relationship, rules for searching the database for new infrastructure elements.

In the alternative non-limiting embodiments of the present technology, the processor 201 can be configured to generate the rules for searching for new infrastructure elements based on the data on the detected features of statistical relationships determined at step (103).

A given rule is based on the set of features that cumulatively represent the detected statistical relationship determined at the previous step. According to certain non-limiting embodiments of the present technology, the given rule can include set of features expressed in some formal pseudolanguage. For example, a given formal pseudolanguage may include, without limitation, SQL, Python, and the like.

Data, as stated above, could be stored in one or several bases/tables. Search is carried out by one or multiple requests to these bases/tables and search for intersections of results.

If the given rule is generated for one feature, for example, for a footprint of a specific service, such as e-mail server CommuniGate Pro version 5.1, the search will be carried out in one base/table where only footprints of different services are stored, as an example.

If the given rule is complex and comprises features of domains, certificates, etc., the requests will be submitted to different bases/tables, for searching for intersections of results.

For example, according to a complex rule there could be carried out a search for all domains registered by AAAA registrar, wherein each of them (domains) has a certificate issued by BBBB company, and also each of the domains ever had IP address at which Apache HTTP had ever been started.

The method 100 hence advances to step (106).
Step 106: Retrieving, by the Processors, Using the Rules, from the Infrastructure Element Database, the New Infrastructure Elements At step (106), in some non-limiting embodiments of the present technology, the processor 201 can be configured to retrieve, using the rule generated at the previous step, the new infrastructure elements from the database.

To that end, the processor 201 can be configured to search for all records satisfying the conditions described by the rules.

In the example provided above, as a result of the search in the database there could be identified a new IP address 99.00.22.11 without the respective Zeus tag but issued by the same hosting provider Provider, LLC to the client with the contact address thirdclient@mail.com on the same day 11.11.2011 as the previous two Zeus-tagged IP addresses.

The method 100 hence advances to step (107).
Step 107: Assigning, by the Processor, the Respective Tag Associated with the Given Malicious Infrastructure to the New Infrastructure Elements, Thereby Updating the Infrastructure Element Database for Further Use in Determining New Infrastructure Elements of the Given Malicious Infrastructure At step (107), the processor 201 can be configured to assign the respective tag, such as the respective Zeus tag mentioned above, associated with the at least one infrastructure element and the at least one additional infrastructure element to the new infrastructure elements retrieved from the database using the rules determined as described above.

More specifically, following the example provided above, the processor 201 can be configured to assign the respective Zeus tag to the found IP address and store the result in the database. By doing so, the processor 201 is configured to update the database for further use in identifying other/existing malicious infrastructures.

It is worth noting that such algorithm allows to detect "sleeping", i.e. already created but never used yet, infrastructure elements of malwares or cybercriminals.

In the given example the found IP address 99.00.22.11 and related domain name could have been created by developers of Zeus malware beforehand, however, they remain undetected by any conventional cybersecurity means as the malware has never contacted this server yet.

Without direct reference to the above steps there is also continuous updating of the above-mentioned database. For example, the processor 201 can be configured to additionally update the database by continuous Internet scanning and taking footprints from the services launched at open server ports. At the same time, the processor 201 can be configured to collect data on domains related to the found servers.

Taking footprints from the services launched at remote server ports can be carried out by the processor 201 executing a vulnerability scanner which could be implemented by any known method. The so identified results can further be arranged and stored, by the processor 201, in the database.

The method 100 thus terminates.

Computer System

Figure 2:
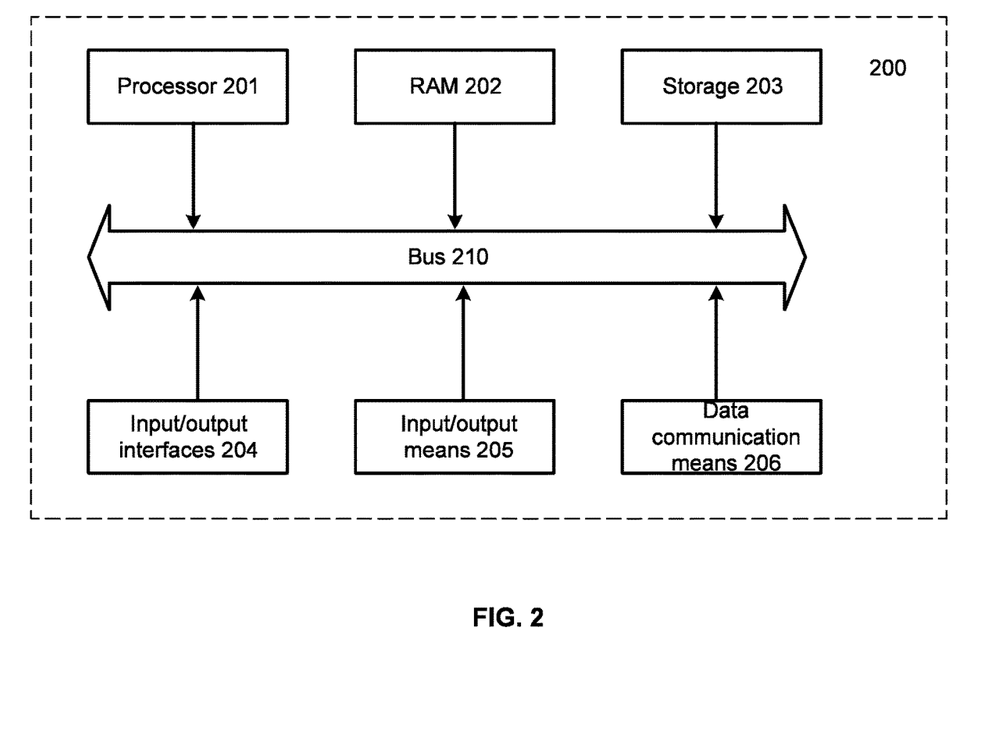
FIG. 2 depicts a schematic diagram of an example computing environment configurable for execution of the present method of FIG. 1, in accordance with certain non-limiting embodiments of the present technology.

With reference to FIG. 2, there is depicted an example functional diagram of the computer system 200 configurable to implement certain non-limiting embodiments of the present technology including the method 100 described above.

In some non-limiting embodiments of the present technology, the computer system 200 may include: the processor 201 comprising one or more central processing units (CPUs), at least one non-transitory computer-readable memory 202 (RAM), a storage 203, input/output interfaces 204, input/output means 205, data communication means 206.

According to some non-limiting embodiments of the present technology, the processor 201 may be configured to execute specific program instructions the computations as required for the computer system 200 to function properly or to ensure the functioning of one or more of its components. The processor 201 may further be configured to execute specific machine-readable instructions stored in the at least one non-transitory computer-readable memory 202, for example, those causing the computer system 200 to execute the method 100.

In some non-limiting embodiments of the present technology, the machine-readable instructions representative of software components of disclosed systems may be implemented using any programming language or scripts, such as C, C++, C#, Java, JavaScript, VBScript, Macromedia Cold Fusion, COBOL, Microsoft Active Server Pages, Assembly, Perl, PHP, AWK, Python, Visual Basic, SQL Stored Procedures, PL/SQL, any UNIX shell scrips or XML. Various algorithms are implemented with any combination of the data structures, objects, processes, procedures and other software elements.

The at least one non-transitory computer-readable memory 202 may be implemented as RAM and contains the necessary program logic to provide the requisite functionality.

The storage 203 may be implemented as at least one of an HDD drive, an SSD drive, a RAID array, a network storage, a flash memory, an optical drive (such as CD, DVD, MD, Blu-ray), etc. The storage 203 may be configured for long-term storage of various data, e.g., the aforementioned documents with user data sets, databases with the time intervals measured for each user, user IDs, etc.

The input/output interfaces 204 may comprise various interfaces, such as at least one of USB, RS232, RJ45, LPT, COM, HDMI, PS/2, Lightning, FireWire, etc.

The input/output means 205 may include at least one of a keyboard, a joystick, a (touchscreen) display, a projector, a touchpad, a mouse, a trackball, a stylus, speakers, a microphone, and the like. A communication link between each one of the input/output means 205 can be wired (for example, connecting the keyboard via a PS/2 or USB port on the chassis of the desktop PC) or wireless (for example, via a wireless link, e.g., radio link, to the base station which is directly connected to the PC, e.g., to a USB port).

The data communication means 206 may be selected based on a particular implementation of a network, to which the computer system 200 can have access, and may comprise at least one of: an Ethernet card, a WLAN/Wi-Fi adapter, a Bluetooth adapter, a BLE adapter, an NFC adapter, an IrDa, a RFID adapter, a GSM modem, and the like. As such, the input/output interfaces 204 may be configured for wired and wireless data transmission, via one of a WAN, a PAN, a LAN, an Intranet, the Internet, a WLAN, a WMAN, or a GSM network, as an example.

These and other components of the computer system 200 may be linked together using a common data bus 210.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be provided as an example only rather than limiting. The scope of the present technology is therefore intended to be limited solely by the scope of the appended claims.

The invention claimed is:

1. A computer-implementable method for detecting elements of a malicious infrastructure in an infrastructure element database, the method being executable by at least one processor, the method comprising:
   receiving a request comprising an infrastructure element of the malicious infrastructure,
      the malicious infrastructure being associated with a tag, the tag being indicative of at least one of a cybercriminal and a piece of malware known to be associated with the malicious infrastructure;
      the infrastructure element having a parameter,
         the infrastructure element comprising at least one selected from the group consisting of: an Internet Protocol (IP) address; a domain name; a Secure Sockets Layer (SSL) certificate; a server; a web service; an e-mail address; and a telephone number; and
         the parameter including at least one selected from the group consisting of: an other associated IP address, an SSL key, a Secure Shell (SSH) footprint, a list of running services, a history of running services, a history of domain names, a history of IP addresses, a history of Domain Name System (DNS) servers, a history of domain name or IP address owners, a hosting provider, and a geographic location;
   searching the infrastructure element database to identify therein, based at least on the tag associated with the infrastructure element, (i) an additional infrastructure element; (ii) and an additional parameter of the additional infrastructure element,
      the additional infrastructure element having been assigned with the tag, indicative of the additional infrastructure element being known to be associated with the malicious infrastructure;
   executing a machine-learning algorithm (MLA) to analyze (i) the infrastructure element and the parameter thereof, and (ii) the additional infrastructure element and the additional parameter thereof to determine whether the respective parameter of the infrastructure element and the additional parameter of the additional infrastructure element are both linked to at least one other parameter of a new infrastructure element, which is unidentified and unknown to be associated with any malicious infrastructure, the MLA having been trained to determine, based on previously determined relations of given-type parameters of a training infrastructure element with other parameters, whether the given-type parameters of the infrastructure element are linked to the other parameters according to the previously determined relations associated with the training infrastructure element;

in response to determining that the respective parameter of the infrastructure element is linked to the at least one other parameter akin to the additional parameter of the additional infrastructure element being linked to the at least one other parameter, generating rules for identifying, in the infrastructure element database, new infrastructure elements, which were previously unidentified and unknown to be associated with any malicious infrastructure, a given rule of the rules including a regular expression that is representative of how the respective parameter and the additional respective parameter are linked to a given one of the at least one other parameter;

retrieving, using the rules, from the infrastructure element database, the new infrastructure elements; and determining the new infrastructure elements as being associated with the malicious infrastructure by assigning the tag to the new infrastructure elements, thereby updating the infrastructure element database for further use in determining other new infrastructure elements of the malicious infrastructure.

2. The method of claim 1, wherein the infrastructure element database is continuously updated using data obtained by scanning the Internet.

3. The method of claim 2, wherein the scanning the Internet is performed by at least one vulnerability scanner.

4. The method of claim 1, wherein the tag is one of a conventional name and a common name of the at least one selected from the group consisting of the piece malware and the cybercriminal associated with the malicious infrastructure.

5. The method of claim 1, wherein the request comprising the at least one infrastructure element is received from at least one of:
a sandbox;
a malware detonation platform;
a vulnerability scanner;
a honeypot;
an intrusion detection system; and
a system of emergency response to cyber security incidents.

6. The method of claim 1, wherein the determining whether the parameter and the additional parameter are both linked to the at least one other parameter comprises determining a combination thereof by at least one logic operation, and wherein each of the infrastructure element and the additional infrastructure elements respectively associated therewith are different infrastructure elements.

7. The method of claim 1, wherein the rules are stored and updated.

8. A system for detecting elements of a malicious infrastructure in an infrastructure element database, the system comprising:
at least one processor communicatively coupled to the infrastructure element database;
at least one non-transitory computer-readable memory storing executable instructions, which, when executed by the at least one processor, cause the system to:
receive a request comprising an infrastructure element of the malicious infrastructure,
the malicious infrastructure being associated with a tag, the tag being indicative of at least one of a cybercriminal and a piece of malware known to be associated with the malicious infrastructure; the infrastructure element having a parameter,
the infrastructure element comprising at least one selected from the group consisting of: an Internet Protocol (IP) address; a domain name; a Secure Sockets Layer (SSL) certificate; a server; a web service; an e-mail address; and a telephone number; and
the parameter including at least one selected from the group consisting of: an other associated IP address, an SSL key, a Secure Shell (SSH) footprint, a list of running services, a history of running services, a history of domain names, a history of IP addresses, a history of Domain Name System (DNS) servers, a history of domain name or IP address owners, a hosting provider, and a geographic location;
search the infrastructure element database to identify therein, based at least on the tag associated with the infrastructure element, (i) an additional infrastructure element; (ii) and an additional parameter of the additional infrastructure element,
the additional infrastructure element having been assigned with the tag, indicative of the additional infrastructure element being known to be associated with the malicious infrastructure;
execute a machine-learning algorithm (MLA) to analyze (i) the infrastructure element and the parameter thereof, and (ii) the additional infrastructure element and the additional parameter thereof to determine whether the parameter of the infrastructure element and the additional parameter of the additional infrastructure element are both linked to at least one other parameter of a new infrastructure element, which is unidentified and unknown to be associated with any malicious infrastructure,
the MLA having been trained to determine, based on previously determined relations of given-type parameters of a training infrastructure element with other parameters, whether the given-type parameters of the infrastructure element are linked to the other parameters according to the previously determined relations associated with the training infrastructure element;
in response to determining that the respective parameter of the infrastructure element is linked to the at least one other parameter akin to the additional parameter of the additional infrastructure element being linked to the at least one other parameter, generate rules for identifying, in the infrastructure element database, new infrastructure elements, which were previously unidentified and unknown to be associated with any malicious infrastructure,
a given rule of the rules including a regular expression that is representative of how the respective parameter and the additional respective parameter are linked to a given one of the at least one other parameter;

retrieve, using the rules, from the infrastructure element database, the new infrastructure elements; and determine the new infrastructure elements as being associated with the malicious infrastructure by assigning the tag to the new infrastructure elements, thereby updating the infrastructure element database for further use in determining other new infrastructure elements of the malicious infrastructure.

\* \* \* \* \*

UNITED STATES PATENT AND TRADEMARK OFFICE
CERTIFICATE OF CORRECTION

PATENT NO. : 12,417,282 B2
APPLICATION NO. : 17/528633
DATED : September 16, 2025
INVENTOR(S) : Dmitry Aleksandrovich Volkov Page 1 of 1

It is certified that error appears in the above-identified patent and that said Letters Patent is hereby corrected as shown below:

In the Claims

Column 12, Claim 1, Line 65 should read --whether the parameter of the infrastructure--

Signed and Sealed this
Second Day of December, 2025

John A. Squires
*Director of the United States Patent and Trademark Office*